(12) United States Patent
Peng et al.

(10) Patent No.: US 9,202,488 B2
(45) Date of Patent: Dec. 1, 2015

(54) LIGHT BLOCKER FOR STRAY LIGHT REDUCTION WITHIN A SLIDER

(71) Applicant: Seagate Technology LLC, Cupertino, CA (US)

(72) Inventors: Chubing Peng, Eden Prairie, MN (US); Lien Lee, Saint Paul, MN (US); Chang Xie, Rosemount, MN (US)

(73) Assignee: Seagate Technology LLC, Cupertino, CA (US)

( * ) Notice: Subject to any disclaimer, the term of this patent is extended or adjusted under 35 U.S.C. 154(b) by 51 days.

(21) Appl. No.: 14/151,356

(22) Filed: Jan. 9, 2014

(65) Prior Publication Data

US 2015/0194172 A1 Jul. 9, 2015

(51) Int. Cl.
*G11B 5/48* (2006.01)
*G11B 5/00* (2006.01)

(52) U.S. Cl.
CPC ...... *G11B 5/4866* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 5,199,090 | A * | 3/1993 | Bell | 385/33 |
| 8,547,804 | B2 | 10/2013 | Shimizu | |
| 8,750,081 | B1 * | 6/2014 | Peng et al. | 369/13.33 |
| 2006/0005216 | A1 * | 1/2006 | Rausch | 720/659 |
| 2006/0093262 | A1 | 5/2006 | Matsumoto et al. | |
| 2006/0119983 | A1 * | 6/2006 | Rausch et al. | 360/128 |
| 2007/0041119 | A1 * | 2/2007 | Matsumoto et al. | 360/59 |
| 2008/0130155 | A1 * | 6/2008 | Naniwa et al. | 360/59 |
| 2008/0204916 | A1 * | 8/2008 | Matsumoto et al. | 360/59 |
| 2009/0052077 | A1 * | 2/2009 | Tanaka et al. | 360/59 |
| 2009/0052833 | A1 | 2/2009 | Yang et al. | |
| 2009/0165285 | A1 * | 7/2009 | Takayama et al. | 29/603.09 |
| 2009/0225464 | A1 * | 9/2009 | Juang et al. | 360/59 |
| 2009/0262608 | A1 * | 10/2009 | Kurita et al. | 369/13.33 |
| 2011/0170381 | A1 * | 7/2011 | Matsumoto | 369/13.33 |
| 2012/0051195 | A1 * | 3/2012 | Shimizu | 369/13.17 |
| 2012/0092971 | A1 * | 4/2012 | Schreck et al. | 369/13.24 |
| 2013/0016591 | A1 * | 1/2013 | Tomikawa et al. | 369/13.02 |
| 2013/0279313 | A1 * | 10/2013 | Huang et al. | 369/13.31 |
| 2013/0279314 | A1 * | 10/2013 | Peng | 369/13.33 |
| 2014/0110606 | A1 * | 4/2014 | Furukawa et al. | 250/492.2 |
| 2015/0036470 | A1 * | 2/2015 | Balamane et al. | 369/13.33 |

* cited by examiner

*Primary Examiner* — Peter Vincent Agustin
(74) *Attorney, Agent, or Firm* — Hollingsworth Davis, LLC

(57) ABSTRACT

A waveguide has an input end near a top of a slider coupled to receive light from an energy source. The waveguide delivers the light at an output end of the waveguide near a bottom of the slider. The apparatus includes light blocking members on respective first and second cross track sides of the waveguide. The light blocking members are configured to block stray light away from a light path. The light blocking members are at a location along a length of the waveguide between the top and the bottom of the slider. Confinement of light within the waveguide is near a maximum at the location.

20 Claims, 6 Drawing Sheets

LIGHT BLOCKER FOR STRAY LIGHT REDUCTION WITHIN A SLIDER

SUMMARY

Some embodiments involve an apparatus having a waveguide. The waveguide has an input end near a top of a slider coupled to receive light from an energy source. The waveguide delivers the light at an output end of the waveguide near a bottom of the slider. The apparatus includes light blocking members on respective first and second cross track sides of the waveguide. The light blocking members are configured to block stray light away from a light path. The light blocking members are at a location along a length of the waveguide between the top and the bottom of the slider. Confinement of light within the waveguide is at a maximum at the location.

According to some implementations, a method includes receiving light from an energy source via a waveguide comprising an input end near a top of a slider. The light is delivered to an output end of the waveguide near a bottom of the slider. Stray light is blocked within the slider via light blocking members on respective first and second cross track sides of the waveguide. The light blocking members are at a location along a length of the waveguide between the top and the bottom of the slider. Confinement of light within the waveguide is near a maximum at the location.

Some embodiments involve a method of light from an energy source via a waveguide comprising an input end near a top of a slider. Light is delivered to an output end of the waveguide near a bottom of the slider. Stray light is blocked within the slider via light blocking members on respective first and second cross track sides of the waveguide. The light blocking members are at a location along a length of the waveguide between the top and the bottom of the slider, confinement of light within the waveguide being near a maximum at the location.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
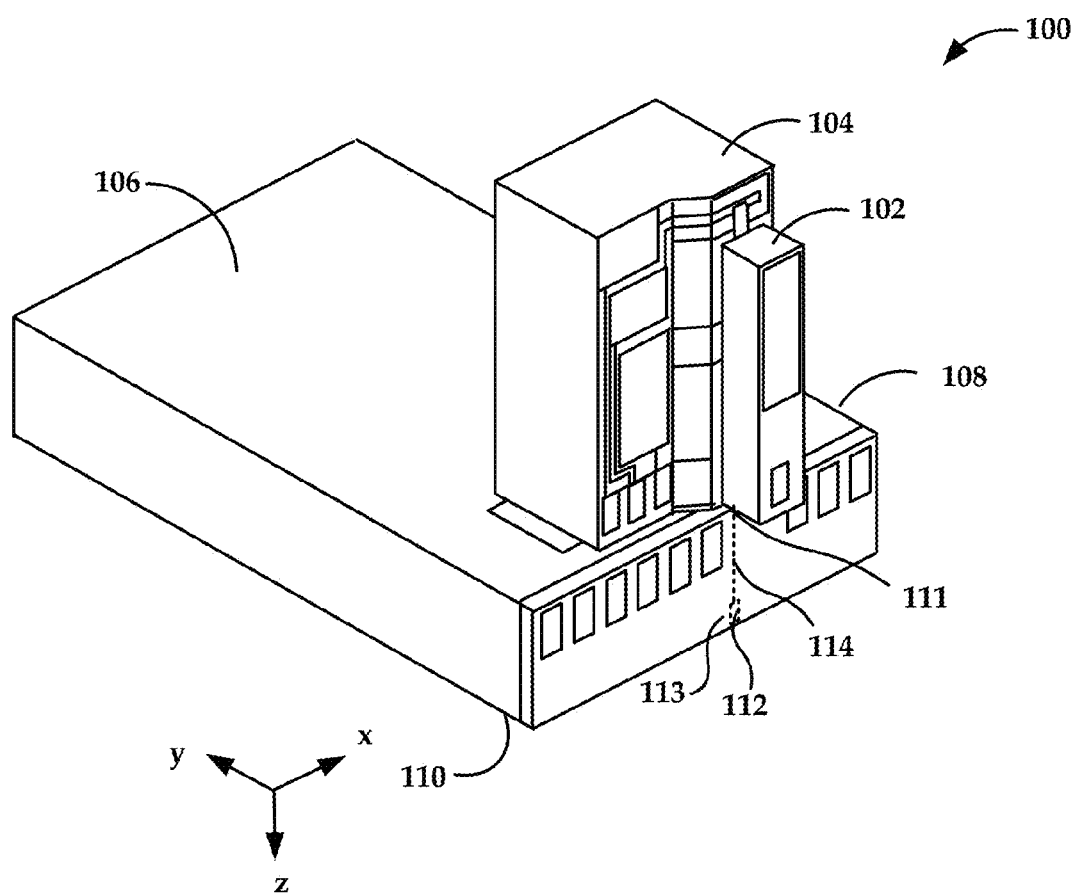
FIG. 1 is a perspective view showing HAMR slider assembly according to some embodiments.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The present disclosure generally relates to magnetic recording devices used for data storage. Methods and systems are described herein that can facilitate assembly of very small scale optical devices. These methods and systems can be used, for example, for assembling heat-assisted magnetic recording (HAMR) devices, which can also be described as thermal-assisted magnetic recording (TAMR) and energy-assisted magnetic recording (EAMR). Generally, a HAMR device uses a light source, such as a laser diode, to heat a magnetic medium while it is storing the data.

A HAMR data storage medium has a high magnetic coercivity that is able to overcome superparamagnetic effects (e.g., thermally-induced, random, changes in magnetic orientations) that currently limit the areal data density of conventional hard drive media. In a HAMR device, a small portion, or "hot spot", of the magnetic medium is locally heated to its increase its coercivity, thereby allowing magnetic orientation of the medium to be changed at the hot spot while being written to by a transducer (e.g., magnetic write pole).

A HAMR read/write head, sometimes referred to as a slider, includes magnetic read and write transducers similar to those on current hard drives. For example, data can be read by a magneto-resistive sensor that detects magnetic fluctuations of the moving medium. Data can be written to the magnetic medium by a write coil that is magnetically coupled to a write pole.

The tiny and confined optical spot used for HAMR can be achieved by employing a near field transducer (NFT) that converts electromagnetic radiation to surface plasmons. The NFT is a near-field optics device designed to reach local surface plasmon conditions at a designed wavelength. A waveguide and/or other optical element concentrates light on a transducer region (e.g., focal region) near which the NFT is located. The NFT is designed to achieve surface plasmon resonance in response to this concentration of light. At resonance, a high electric field surrounds the NFT due to the collective oscillations of electrons at the metal surface. Part of this field will tunnel into a storage medium and get absorbed, thereby raising the temperature of a spot on the media as it being recorded.

A light source, such as a laser diode, is deployed on or in a slider to generate light that is conveyed along a light delivery path to the NFT. In some configurations, the laser light may be directed along the light delivery path to the NFT by a waveguide input coupler and/or one or more mirrors. It can be helpful to limit the number of mirrors in the light path and/or to shorten the propagation distance for greater light delivery efficiency. In some configurations, the light source can be a separately-manufactured device that can be attached to the slider. In these configurations, the light source can be attached to an outer surface (e.g., a top surface) of the slider (laser-on-slider or LOS).

The mirrors and waveguide input coupler are part of the light delivery path that delivers light from the laser diode to the NFT. In some implementations, the light delivery path uses three-mirrors and a waveguide input coupler that couples light into the light delivery path is about 100 µm to 350 µm offset from the center of the slider. Other slider implementations use a straight-through light path. Some embodiments use only one mirror, e.g., a solid immersion mirror (SIM) that collects and focuses the light on the NFT. In straight through embodiments, the waveguide input coupler and NFT may be arranged along the center of the slider. Some embodiments use a three-dimensional channel waveguide all the way to the air bearing surface (ABS) for light delivery and a NFT is placed near the end of the waveguide.

With a short propagation distance, stray light, e.g., light that is not coupled into the waveguide or scattered out of the waveguide, may not have enough propagation distance to radiate out of the slider before reaching the ABS (air-bearing surface). In embodiments that employ a SIM, for example, at least part of the stray light can be collected by the SIM, due to its entrance opening width, e.g. between about 10 and 100 µm. The stray light may cause dual-peak, multiple-peak, and/or broad peak light in the far-field transmission. Alignment of the light source output with the waveguide input coupler may seek to provide optimal optical coupling into the waveguide input coupler. The dual-peak, multiple-peak, and/or broad peak light complicate alignment of the light source with the waveguide input coupler. In some cases, stray light may heat the media, causing partial erasure of written data bits.

Some implementations include a channel waveguide having an input end near a top of a slider coupled to receive light from an energy source. The waveguide may be configured to deliver the light at an output end of the waveguide near the bottom of the slider. In some cases, two light blocking members are configured to block stray light within the slider. The light blocking members may be at a location along the length of the waveguide between the top and the bottom of the slider, the confinement of light within the waveguide being near or at a maximum at the location.

FIG. 1 is a perspective view showing HAMR slider assembly 100 according to some embodiments. In this example, laser diode 102 is mounted to submount 104, and submount 104 is attached to top surface 106 of slider body 108. Laser diode 102 in this example is an edge-emitting laser that emits light in the z-direction. Submount 104 can orient the laser output in a desired direction allowing it to be directly guided into waveguide input coupler 111 of channel waveguide 114 within slider body 108. Channel waveguides may have a finite cross-section normal to a propagation direction. Channel waveguide 114 directs the laser output energy so that it is emitted from media-facing, air-bearing surface 110 of slider body 108, thereby heating a proximate magnetic medium (not shown) that moves underneath slider assembly 100.

Media-facing surface 110 can be configured as an air-bearing surface (ABS) that maintains a cushion of air between slider body 108 and the recording medium. Transducer region 113 of slider body 108 includes at least a write transducer that generates a magnetic field and an optical transducer that receives energy from laser diode 102 and directs the energy to the recording medium. The optical transducer can include a NFT 112 that directs the energy via surface plasmon resonance. Optical channel waveguide 114 includes optical components (e.g., waveguides, mirrors, couplers, decouplers, etc.) that are integrated in slider body 108 and facilitate delivering energy from laser diode 102 to NFT 112.

In the illustrated slider assembly 100, laser diode 102, submount 104 and slider body 108 can be formed using integrated circuit/optics manufacturing techniques. For example, the components can be formed by (among other things) depositing layers of material on a wafer substrate, creating features in the layers using photolithography, chemical/mechanical polishing, and dividing the wafer into individual components. Afterwards, laser diode 102 can be bonded or attached (e.g., soldered) to submount 104 and submount 104 can then be attached to slider body 108. These components can be attached by bonding features such as a solder pads, bond lines, bond layers, etc.

Attachment/bonding can occur in another order, e.g., submount 104 can be bonded to slider body 108 before laser diode 102 is attached. In either case, it can be desirable to precisely align the output of laser diode 102 with the optical waveguide 114 to minimize optical losses. The alignment between components described herein can occur, for example, before or during reflow of bonding features.

Light from the laser diode that is guided into the channel waveguide can be routed by the channel waveguide and, if present, additional optical elements such as mirrors, into the center of the slider and can be focused by a solid immersion mirror (SIM). If the laser diode is not properly aligned with the waveguide input coupler, then less light can reach the solid immersion mirror and, ultimately, any recording media at the air-bearing surface of the HAMR recording device. Laser diode-to-waveguide input coupler alignment can be carried out by maximizing light transmission through the SIM if an offset between the SIM and the waveguide input coupler is large (for example, 200 µm), stray light propagating through the slider may not be collected by an objective of high numerical aperture focused at the SIM center. According to various implementations, if SIM is used in the light path, a planar waveguide is connected to the end of the channel waveguide. The light blockers may to be placed at the channel waveguide. Light exiting from the channel waveguide is divergent along the waveguide plane and a SIM may be used to focus the light into a small spot.

For straight-through light delivery, stray light and guided modes can be mixed at the air-bearing surface. The SIM can have a high numerical aperture, causing only a fraction of the light reflected from the SIM sidewall to propagate to the far-field due to total internal reflection. Consequently, in the far-field, before the laser diode is aligned to an input coupler, such as a waveguide input coupler, any detector used to align the laser diode and the waveguide input coupler cannot rely on far-field transmission feedback.

Embodiments described herein facilitate blocking stray light from a light source, such as a laser diode. The light source can be capable of being positioned in a cross-track, a down-track, and a vertical direction with regards to the waveguide coupler and referenced to recording media at the air-bearing surface. Generally, the term "vertical" in this disclosure is intended to describe a direction normal to the respective interface surfaces of two components, such as the light source 210 and slider shown in the embodiments shown in FIG. 2A. The use of the term "vertical" is not intended to limit any relative or absolute orientation of the components being positioned, e.g., relative to the earth's surface.

Figure 2A:
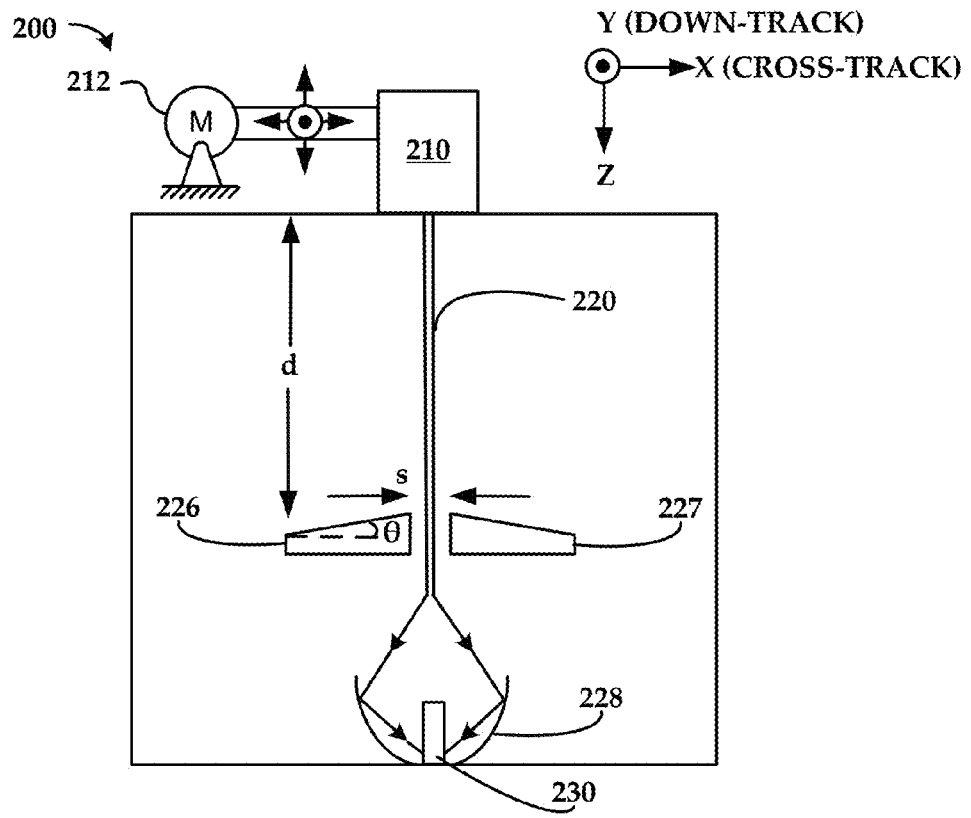
FIGS. 2A and 2B are diagrams of a light delivery system that includes a stray light blocker according to embodiments described herein.
Figure 2B:
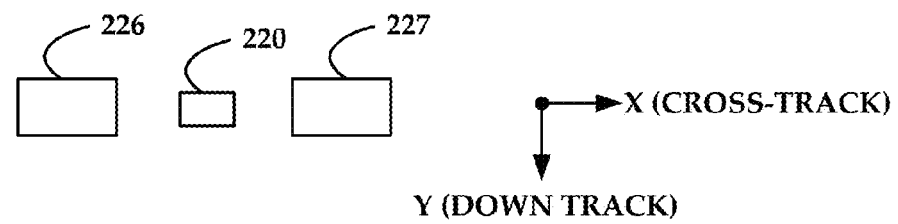

FIG. 2A is a diagram of a light delivery system 200 that includes a stray light blocker according to embodiments described herein. Light delivery system 200 can be used for alignment of straight-through light delivery components (e.g., laser-on-slider assembly). Light delivery system 200 can operate on a light source 210 which, in some embodiments, can be an edge-emitting laser diode. Light source 210 can be moved in a cross-track (x), a down-track (y), or a vertical (z) direction as shown in FIGS. 2A and 2B. In some embodiments, the light delivery system 200 can include a micro-translational stage (represented schematically as motor-actuator 212) moveable in three directions that supports light source 210, slider, or both can be supported on a translation stage moveable in three directions. Light delivery system 200 can include slider that has an embedded waveguide input coupler 220. Waveguide input coupler 220 can include beam expander. Light can be guided from light source 210 into waveguide input coupler 220 which, in turn, can deliver light to SIM 228.

Due to mode mismatch between light source and slider waveguide as well as misalignment between light source and waveguide input coupler, only a portion of light from the light source is coupled into the waveguide 220 and the rest of the light still propagates divergently in the slider as a stray light. Portion of stray light is also focused by the SIM 228, which may heat the NFT and magnetic pole 230 as well as the media. In some cases, the stray light may cause degradation in the performance of the writer and also the recording performance in a media. The stray light may prevent the laser source from being precisely assembled onto the waveguide when the light transmission from the slider is used as a feedback signal, for example.

Light blockers 226, 227 may be placed in the light path to reduce stray light. In some cases, there are more than two light blockers. According to some embodiments, the inclination angle of light blocker 226 is different than the inclination angle of light blocker 227. SIM 228 can be etched into slider to condense the beam of light exiting channel waveguide input coupler 220 in the direction parallel to the waveguide plane (x-z plane, for example). Normal to the waveguide plane, light can be confined by the core of waveguide 220. The light can be guided from light source 210 into waveguide input coupler 220 by, for example, butt coupling.

The position, d, of light blocker along propagation direction z may be chosen such that light has been converted into the waveguide and is most tightly confined in the waveguide. For example, d is 40-100 μm. The separation, s, in the light blocker, may be chosen to reduce or minimize the disturbance of the waveguide mode and as narrow as for block efficiency. For example, s may be between two and six times of the mode field diameter of the waveguide or four and six times the mode field diameter of the waveguide. According to various implementations s is 5 μm, for example. In some cases, s is 1-10 μm. In some cases, the light blockers 226, 227 are an equal distance along the x direction away from the waveguide input coupler 220. In some embodiments, one light blocker 226, 227 is a different distance away in the x direction from the waveguide input coupler 220 than the other light blocker 226, 227.

To prevent reflection back into the laser source cavity, which may cause laser instability, the light blockers 226, 227, having an inclination angle, θ, may have a slope facing the light source 210. For example, the light blockers 226, 227 may have an inclination angle, θ, of 5°, in some cases, θ is determined by using Equation 1

$$\tan(\theta) d > l/2 \quad \text{Equation 1}$$

where l is the laser diode emitting dimension along the x direction. For example, if the diode emitting dimension is 10 μm, d=100 μm and θ>2.9°]. In some cases, the light blocker 226, 227 have different inclination angles. The material for the light blockers 226, 227 could be reflective metals, such as noble metals Au, Cu, Al or partially reflective and partially absorptive, such as the materials for magnetic pole (NiFe, NiFeCo).

The light blockers 226, 227 may be configured to reduce the stray light in cross-track direction, without significant blocking in the downtrack direction. For light source with an edge-emitting laser diode, for example, the fast axis of the laser may be aligned along the down-track direction and the slow axis of the laser may be aligned along the cross track direction. Since light in the fast axis is much more divergent than the slow axis, and magnetic poles may be able to function as a light blocker, due to the magnetic poles (including any of a main pole, return pole, and current coils) being placed in the down track direction relative to the SIM and/or NFT. FIG. 2B illustrates a cross section of some of the components in FIG. 2B. As shown, the waveguide 220 is between the light blockers 226, 227.

The optical components in slider can be built into the slider during fabrication of the slider. Thus, waveguide input coupler 220, light blockers 226, 227, and solid immersion mirror 228 can all be integrated optics devices. Light that is captured by solid immersion mirror 228 can emerge from slider at an air-bearing surface.

Figure 3:
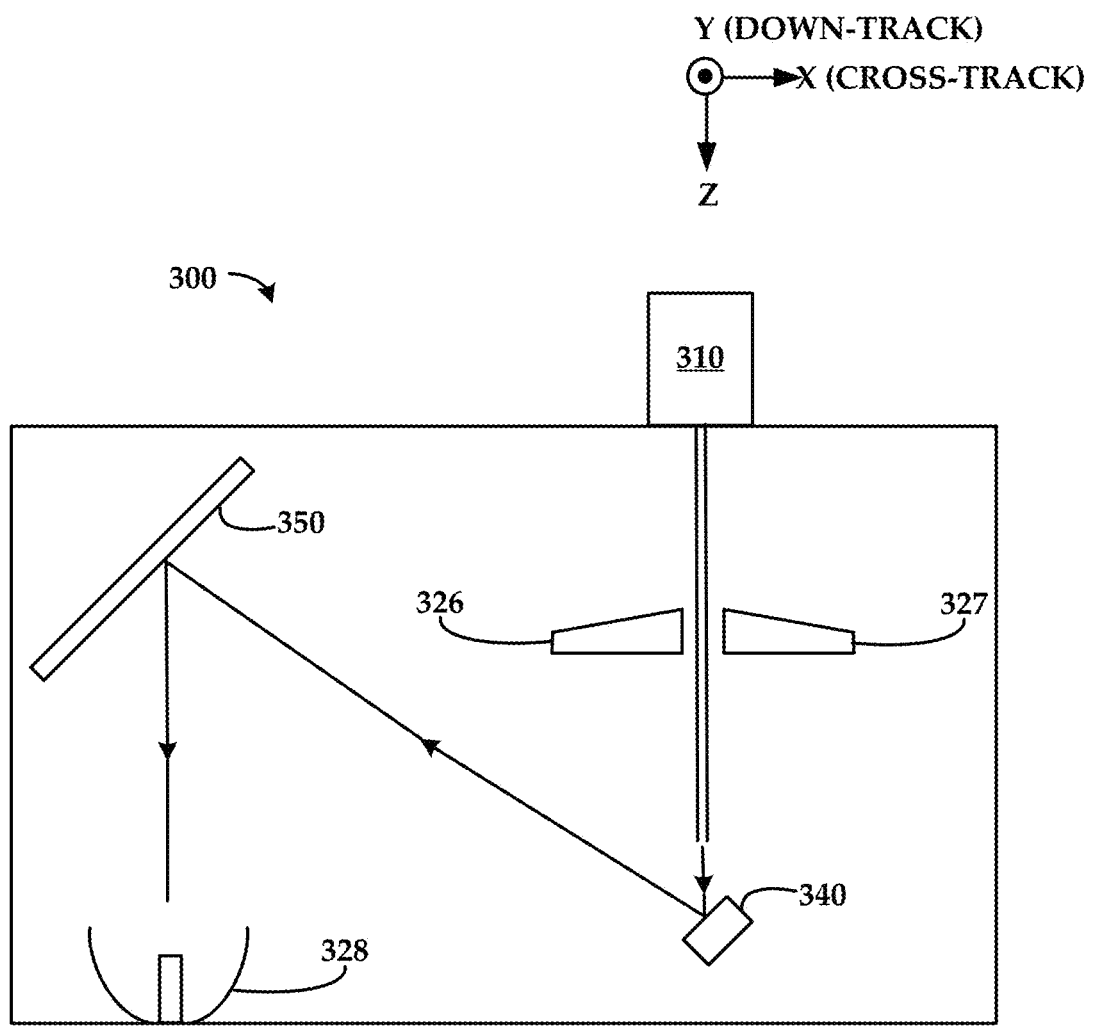
FIG. 3 illustrates a light delivery system with light blockers and having two extra mirrors in accordance with some implementations.
Figure 4:
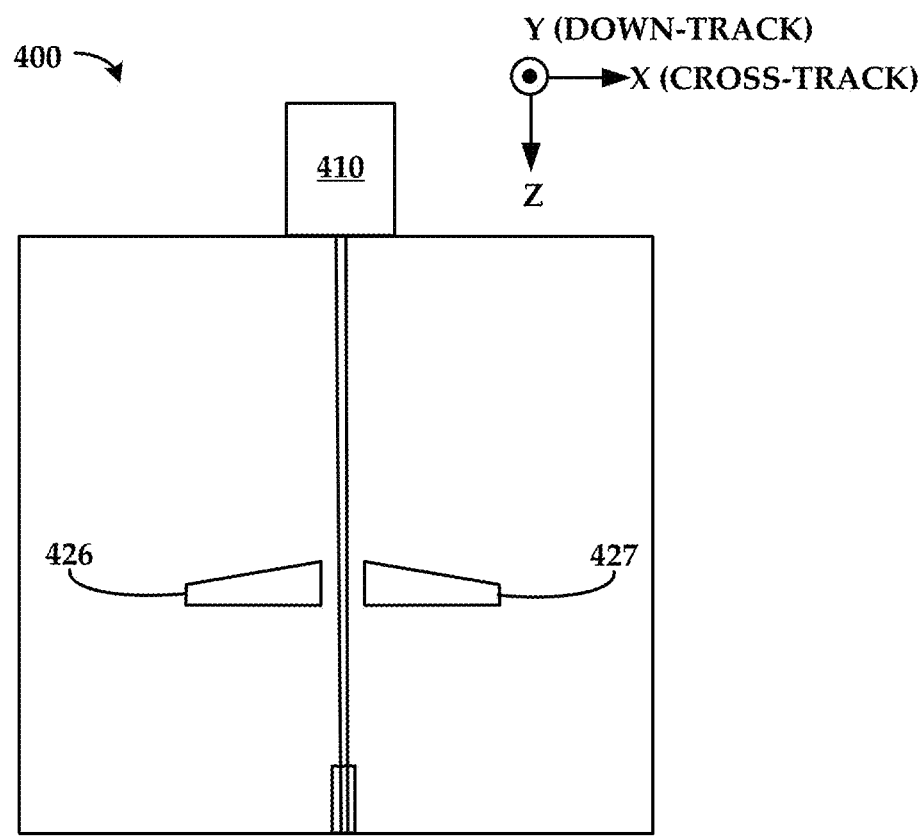
FIG. 4 illustrates a light delivery system without a SIM and with light blockers according to various aspects.

FIG. 3 illustrates a light delivery system 300 with light blockers 326, 327 and having two mirrors 340, 350. The light source 310 is offset from the SIM 328 center line along the x-direction by, for example, 102 μm. Two extra mirrors 340, 350, are used to route and shape the light beam to illuminate the SIM 328. According to various embodiments, the offset light path of FIG. 3 may result in less stray light than in the system of FIG. 2A. FIG. 4 illustrates a light delivery system 400 having a light source 410 and light blockers 426, 427 and without a SIM. In some cases, the stray light produced in the light delivery system of FIG. 4 will be less than the stray light produced for the light delivery system of FIG. 2A due to the divergence of the stray light, for example. Mirror 350 collimates the diverging light beam from the waveguide input coupler onto the SIM 328.

Figure 5:
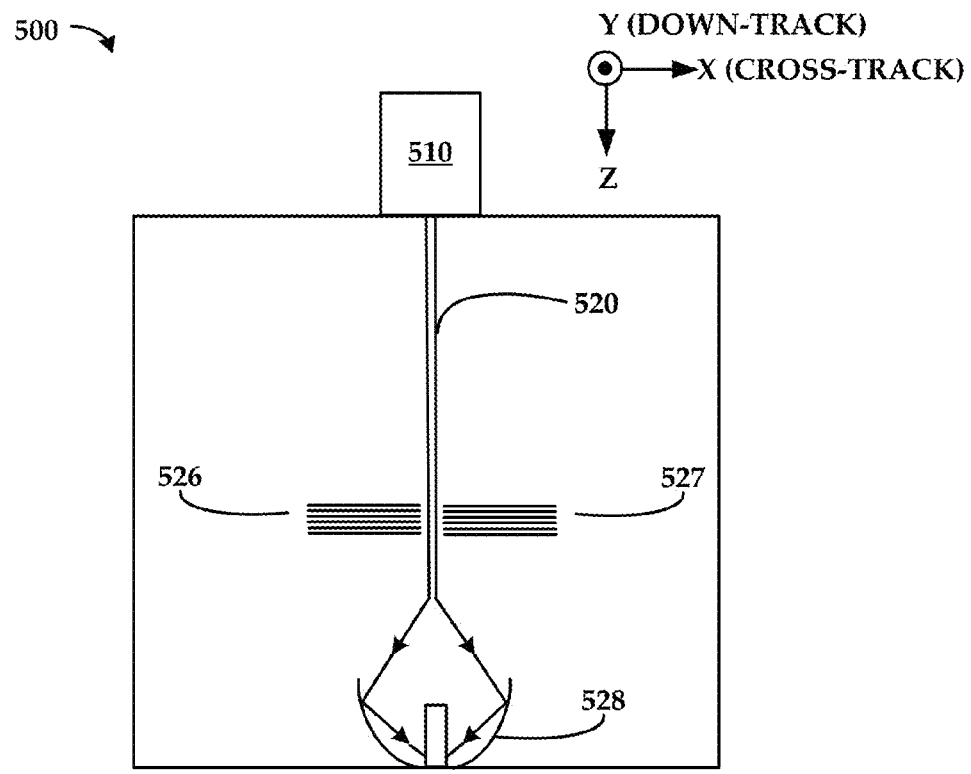
FIG. 5 illustrates a light delivery system having a light blocker with a grating according to some implementations.
Figure 6:
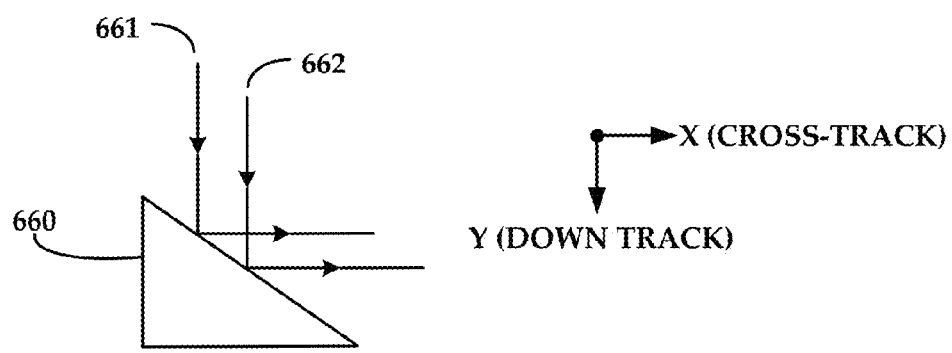
FIG. 6 shows a light delivery system having an out-of-plane mirror that reflects stray light out of the slider in accordance with various embodiments.

FIG. 5 illustrates a light delivery system 500 having a light blocker 526, 527 that includes one or more diffraction gratings 526, 527. Light can be guided from light source 510 into waveguide input coupler 520 which, in turn, delivers light to SIM 528. The light blocker gratings 526, 527 diffracts stray light out of the slider, for example. FIG. 6 shows a light delivery system having an out-of-plane mirror 660 that reflects the stray light 661, 662 out of the slider. The out-of-plane stray light may be incident onto a photodiode to use a light power monitor. In some cases, the out-of plane light is used as a feedback signal for cross-track alignment between light source and waveguide input coupler. The light blocker may be used to monitor the optical power variation from the light source, if replaced with a bolometer. In some cases, the bolometer senses temperature variation and is placed on a nearby light blocker.

Examples

Figure 7A:
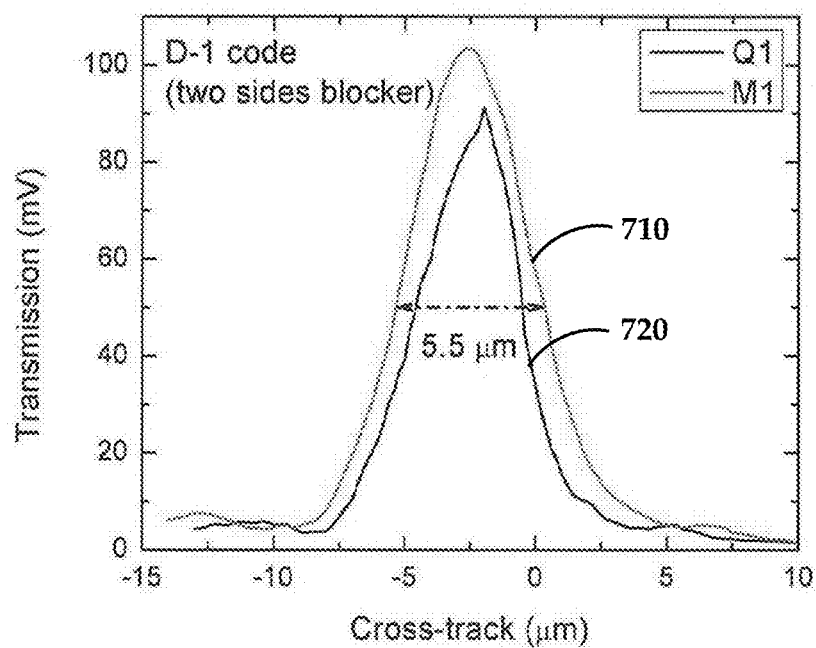
FIGS. 7A and 7B show the measured transmitted light from the SIM to far-field with or without a light blocker according to some aspects.
Figure 7B:
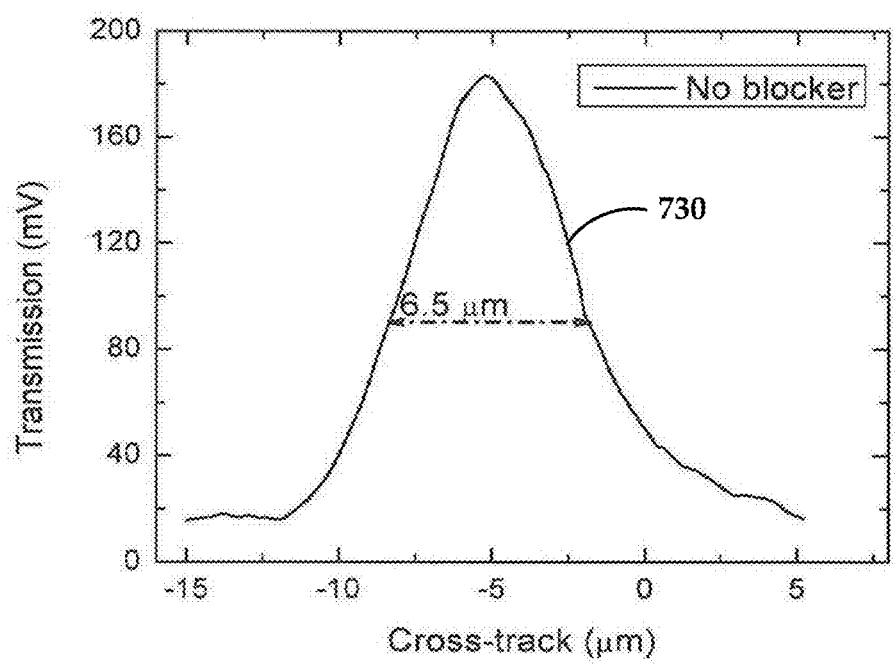

FIGS. 7A and 7B show the measured transmitted light from the SIM to far-field with or without a light blocker as the light source scans along the x-direction around the waveguide input coupler. The light path used for FIGS. 7A and 7B is the light path shown in FIG. 3. Curves 710 and 720 represent measured transmitted light along the x direction from the SIM to far-field with a light blocker for two different devices. Curve 730 represents measured transmitted light along the x direction from the SIM to far-field without a light blocker.

The light source is 102 μm off from the center line of SIM along x direction. The light blocker separation 5 μm, which is about 6 times of the mode field diameter, and inclination angle of $\theta=5°$. At the light source centered at the waveguide input coupler, the transmission light is reduced by 80% with the light blocker, which can be seen by comparing curves 710 and 720 with curve 730. To confirm that this reduction is mainly caused by blocking stray light, near-field measurement is done by scanning an aperture probe over the ABS to detect the SIM focusing field. It is found that near-field intensity is only 10-20% lower with the presence of the light blocker.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. In one variation, a light blocking member one side of a waveguide may be configured as shown in one of FIGS. 2A-6 and a light blocking member on another side may be configured as shown in another of these figures. For example, a light blocking member one side may be configured as a grating, and a light blocking member another side may be configured as an absorber and/or reflector.

In another variation, light blocking members of different types may be located proximate one another, e.g., a grating located proximate an absorber/reflector. In yet other variations, one or more light blocking members may be located at a location such that confinement of light within the waveguide is n a maximum, and one or more other light blocking members may be located at another location where confinement of light within the waveguide is not at a maximum.

This application is intended to cover any adaptations or variations of the specific embodiments discussed herein. Therefore, it is intended that this disclosure be limited only by the claims and the equivalents thereof.

What is claimed is:

1. An apparatus comprising:
   a waveguide comprising an input end near a top of a slider coupled to receive light from an energy source, the waveguide delivering the light at an output end of the waveguide near a bottom of the slider; and
   light blocking members on respective first and second cross track sides of the waveguide and configured to block stray light away from a light path, the light blocking members at a location along a length of the waveguide between the top and the bottom of the slider, confinement of light within the waveguide being near a maximum at the location, the light blocking members comprising at least one of diffraction gratings, out-of-plane mirrors, and a bolometer.

2. The apparatus of claim 1, wherein the light blocking members comprises top edges facing a top surface of the slider, the top edges oriented at an angle that causes at least a portion of the stray light to be reflected from the top edges away from the output end of the waveguide and the energy source.

3. The apparatus of claim 1, wherein the light blocking members are formed of a reflective metal.

4. The apparatus of claim 3, wherein the reflective metal comprises one of Au, Cu, Al, or an alloy thereof.

5. The apparatus of claim 1, wherein the light blocking members are formed of a partially absorptive metal.

6. The apparatus of claim 5, wherein the partially absorptive metal comprises one of magnetic materials NiFe or NiFeCo used for magnetic pole.

7. The apparatus of claim 1, wherein a cross-track separation between the light blocking members is greater than a mode field diameter of the waveguide at a position of the light blocking members.

8. The apparatus of claim 1, wherein the light blocking members comprise gratings that diffract the stray light out of the slider.

9. The apparatus of claim 1, wherein the light blocking members comprise out-of-plane mirrors to reflect light out of the slider.

10. The apparatus of claim 1, wherein at least one of the light blocking members comprises a bolometer.

11. The apparatus of claim 1, further comprising a three-dimensional, channel waveguide at the input end of the waveguide, the channel waveguide coupling the light from the energy source to the waveguide in the slider.

12. An apparatus comprising:
    a waveguide comprising an input end near a top of a slider coupled to receive light from an energy source, the waveguide delivering the light at an output end of the waveguide near the bottom of the slider; and
    light blocking members on respective first and second cross track sides of the waveguide and configured to block stray light within the slider, the light blocking members comprising top edges facing a top surface of the slider, the top edges oriented at an angle that causes at least a portion of the stray light to be reflected from the top edges away from the output end of the waveguide and the energy source.

13. The apparatus of claim 12, wherein the light blocking members at a location along a length of the waveguide between the top and the bottom of the slider, confinement of light within the waveguide being near a maximum at the location.

14. A method comprising:
    receiving light from an energy source via a waveguide comprising an input end near a top of a slider;
    delivering the light to an output end of the waveguide near a bottom of the slider; and
    blocking stray light within the slider via light blocking members on respective first and second cross track sides of the waveguide, the light blocking members at a location along a length of the waveguide between the top and the bottom of the slider, confinement of light within the waveguide being near a maximum at the location, the light blocking members comprising top edges facing a top surface of the slider, the top edges oriented at an angle that causes at least a portion of the stray light to be reflected from the top edges away from the output end of the waveguide and the energy source.

15. The method of claim 14, further comprising reflecting at least a portion of the stray light away from the output end of the waveguide and the energy source via top edges of the light blocking members.

16. The method of claim 14, wherein the light blocking members are formed of a reflective metal.

17. The method of claim 14, wherein the light blocking members are formed of a partially absorptive metal.

18. The method of claim 14, wherein a cross-track separation between the light blocking members is between two and six times a mode field diameter of the waveguide.

19. The method of claim 14, wherein the light blocking members comprise at least one of: diffraction gratings that scatter the stray light out of the slider; out-of-plane mirrors; and a bolometer.

20. The method of claim 14, further comprising coupling the light from the energy source to the waveguide via a planar waveguide at an end of the waveguide.

* * * * *